(12) United States Patent
Fuller et al.

(10) Patent No.: US 6,669,850 B1
(45) Date of Patent: Dec. 30, 2003

(54) PURIFICATION PROCESS

(75) Inventors: Timothy J. Fuller, Pittsford, NY (US); John F. Yanus, Webster, NY (US); Markus R. Silvestri, Fairport, NY (US); Damodar M. Pai, Fairport, NY (US); Samuel Kaplan, Walworth, NY (US); Raymond K. Crandall, Rochester, NY (US); Kathleen M. Carmichael, Williamson, NY (US); David J. Maty, Ontario, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/382,613

(22) Filed: Aug. 25, 1999

(51) Int. Cl.[7] ............................................. B01D 15/00
(52) U.S. Cl. ....................... 210/660; 210/689; 210/690
(58) Field of Search ................................. 210/690, 691, 210/660, 689; 528/196, 198; 558/265, 266

(56) References Cited

U.S. PATENT DOCUMENTS

| | | | |
|---|---|---|---|
| 5,180,497 A | 1/1993 | Sando et al. | 210/665 |
| 5,294,356 A * | 3/1994 | Tanaka et al. | 558/265 |
| 5,607,802 A | 3/1997 | Mishra et al. | 430/58 |
| 5,686,215 A | 11/1997 | Bergfjord, Sr. et al. | 430/58 |
| 5,808,126 A * | 9/1998 | Brzezinska et al. | 556/431 |
| 6,077,978 A * | 6/2000 | McDaniel et al. | 568/620 |

OTHER PUBLICATIONS

Louis F. Fieser and Mary Fieser, "Reagents for Organic Synthesis", John Wiley and Sons, New York (1967), pp. 19, 20 and 634.

* cited by examiner

*Primary Examiner*—Ivars Cintins
(74) *Attorney, Agent, or Firm*—Zosan S. Soong

(57) ABSTRACT

A purification process composed of: contacting a contaminated composition including an optional fluid, a polymer, and an impurity with an adsorbent composition including an adsorbent, wherein the adsorbent is selected from the group consisting of an alumina and a magnesium sulfate, wherein a portion of the impurity binds to the adsorbent, wherein the polymer is a polycarbonate, a carbazole, a polyarylate, or a copolyester having the formula

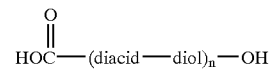

where n is the degree of polymerization.

14 Claims, No Drawings

PURIFICATION PROCESS

FIELD OF THE INVENTION

This invention relates to a purification process for removing impurities from a solution that is subsequently used for example in the fabrication of photoreceptors.

BACKGROUND OF THE INVENTION

Various polymers are used in bulk in forming the layers of a photoreceptor. Examples of polycarbonates, polycarbazoles, polyarylates, and copolyesters that are suitable for use in photoreceptors are discussed in Mishra et al., U.S. Pat. No. 5,607,802 and Bergfjord, Sr. et al., U.S. Pat. No. 5,686,215, the disclosures of which are totally incorporated herein by reference.

These polymers are sometimes contaminated with trace impurities that adversely affect the electrical characteristics of the resulting photoreceptors. The contaminated materials must then be discarded, returned to the supplier, or used for non-critical layers such as the anticurl layer. Sometimes, the trace impurities cannot be identified, or if amenable to identification, the identification process may be costly. Thus, there is a need, which the present invention addresses, for a relatively inexpensive process to purify those polymers that are used in fabricating a photoreceptor. Of course, the polymers described herein can be used for other purposes and in embodiments of the present invention, these polymers as well as the instant purification process are not limited to the field of photoreceptors.

The present purification process involves the use of an adsorbent such as alumina or magnesium sulfate. A number of known uses of alumina and magnesium sulfate are described in "Reagents for Organic Synthesis," Louis F. Fieser and Mary Fieser, John Wiley and Sons, New York (1967), pp.19, 20 and 634.

A conventional purification technique is disclosed in Sando et al., U.S. Pat. No. 5,180,497.

SUMMARY OF THE INVENTION

The present invention is accomplished in embodiments by providing a purification process comprising: contacting a contaminated composition comprised of an optional fluid, a polymer, and an impurity with an adsorbent composition including an adsorbent, wherein the adsorbent is selected from the group consisting of an alumina and a magnesium sulfate, wherein a portion of the impurity binds to the adsorbent, wherein the polymer is a polycarbonate, a carbazole, a polyarylate, or a copolyester having the formula

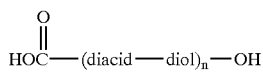

where n is the degree of polymerization.

DETAILED DESCRIPTION

The present purification process involves contacting the contaminated composition with the adsorbent composition. In one embodiment, the contaminated composition is passed through a column packed with the adsorbent composition where at least a portion of the impurity binds to the adsorbent in the column. After passing through the column, the purified solution is substantially or totally free of any impurity. Anhydrous magnesium sulfate was obtained as a fine powder from Fisher Scientific Company with the catalog number M65-500. Neutral alumina (activity 1) was obtained 29 from Aldrich Chemical Company (catalog number 19,997-4) with a reported mesh size of 150 (58 Angstroms), a surface area of 155 meters$^2$ per gram, and with a pH 7.0 (+/−0.5) as an aqueous dispersion. Similarly, activated acidic alumina (Aldrich, catalog number 19,996-6) with a pH 4.5 (+/−0.5) as an aqueous dispersion, and activated basic alumina (Aldrich catalog number 19,944-3) with a pH 9.5 (+/−0.5) as an aqueous dispersion, were obtained with comparable mesh size and surface areas. Alternatively, suitable Woelm acidic and basic aluminas were obtained from ICN Pharmaceuticals, Inc., Life Sciences Group, 26201 Miles Road, Cleveland, Ohio 44128, or Waters Associates, 61 Fountain St., Farmington, Mass. 01701. The use of a column is preferred with the alumina.

Using any of the purification processes described herein, the contaminated composition contacts the adsorbent composition for a time effective for binding a significant portion of the impurity to the adsorbent, preferably at least about 30 minutes, more preferably at least about 4 hours, and especially for a time ranging from about 4 hours to about 16 hours. An optional vacuum may be applied to the contaminated composition during the purification process.

In another embodiment, one forms a slurry of the contaminated composition and the adsorbent composition, thereby resulting in a liquid portion and a solids portion in the slurry, and then separating the liquid portion from the solids portion by for example centrifuging or filtering. At least a portion of the impurity binds to the adsorbent where the impurity and the adsorbent are found in the solids portion. After separation of the liquid portion from the solids portion of the slurry, the liquid portion is substantially or totally free of any impurity.

In embodiments of the present invention, either the contaminated composition, the adsorbent composition, or both may contain a fluid. The fluid in the contaminated composition may be the same or different from the fluid in the adsorbent composition. The fluid in the contaminated composition is preferably a solvent for the polymer such as one or more of the organic liquids described herein. The fluids for the contaminated composition and the adsorbent composition may be an organic liquid such as chlorinated liquids like 1,1,2,2-tetrachloroethane, methylene chloride, and monochlorobenzene; toluene; tetrahydrofuran; polar aprotic liquids such as dimethyl formamide, dimethylacetamide, N-methylpyrrolidinone, and dimethylsulfoxide; water; or mixtures thereof. The preferred fluid for the adsorbent composition is water; magnesium sulfate is soluble in the water, whereas alumina is generally insoluble in water and in many other liquids. The fluid in the adsorbent composition may be a solvent for the polymer.

The contaminated composition may be composed entirely of the polymer and the impurity. If a fluid is present, the amount of polymer in the contaminated composition ranges for example from about 1 to about 50 weight percent, preferably from about 5 to about 20 weight percent, based on the weight of the contaminated composition.

The adsorbent composition may be composed entirely of the adsorbent. If a fluid is present, the amount of adsorbent in the adsorbent composition ranges for example from about 10 to about 95 weight percent, preferably from about 20 to about 70 weight percent, based on the weight of the adsorbent composition.

The anhydrous magnesium sulfate used was a fine powder and was used as received from Fisher Scientific. Because impurity levels are so low (parts per million or less), it is not known how much adsorbent is actually required. Typically, between about 50 and 100 weight percent magnesium sulfate, based on the weight of resin in solution, was used. However, the most important factor in the removal of the impurity is the time of contact between the adsorbent and the polymer in solution. For example, when polycarbonate (50 grams), contaminated with about 10 parts per million of polyethylene oxide (PEO, Scientific Polymer Products catalog number 491, with 7,000 molecular weight), at 10 weight percent solids in methylene chloride, was stirred with 50 grams of magnesium sulfate for about 10 minutes and then the dispersion was rapidly filtered through a sintered glass funnel, the PEO contaminant was not removed, as determined by xerographic testing of photoreceptor devices made with the material. When the same experiment was repeated except that the magnesium sulfate treatment time with the polymer solution was extended to 4 hours, the PEO impurity was completely removed as determined by xerographic testing. Thus, about 10 minutes contact between the magnesium sulfate and the polymer solution may be inadequate, whereas about four hours contact, and preferably about 16 hours contact, was satisfactory to remove all the PEO impurity (to less than 1 part per billion). The slurry method is preferred for the magnesium sulfate for adsorptive filtration and removal of impurities. The magnesium sulfate contained not only polyethylene oxide but also trace amounts of other contaminants including for example one or more of the following: polydimethylsiloxane, amylene, chlorocarbons, and unidentified black and brown colored ferromagnetic impurities.

For comparison, a water wash of the polymer solution, filtration through fluted filter paper, treatment with potassium carbonate (50 grams per 50 grams polycarbonate as a 5 wt. % solids in methylene chloride), and reprecipitation of the polycarbonate in anhydrous methanol were all unsatisfactory methods to remove the polyethylene oxide (PEO) impurity from the contaminated polycarbonate. When the PEO contaminated polycarbonate (5 grams) in methylene chloride (90 grams) was passed drop-wise through a 100-milliliter burette (with a 0.75-inch diameter) packed with 60 milliliters of acidic alumina (activity grade 1, Woelm acid grade (Waters Associates, 61 Fountain St., Farmington, Mass. 01701) by eluting generously with methylene chloride, no trace of the PEO contaminant remained. These experiments were repeated with neutral alumina (Aldrich catalog number 19,997-4) and basic alumina (Woelm), respectively, with comparable, successful results.

Fluid rate flow (through-put) in the column was also important. A column (Aldrich pressure filter funnel catalog number Z14,767-2) was packed with about 4-inches of neutral alumina (Aldrich). Thirty minutes of treatment time was required to remove all the PEO contaminant from 100 milliliters of a 5 weight percent solids solution of the PEO contaminated polycarbonate in methylene chloride by generous elution with methylene chloride. When the flow rate was increased by vacuum filtration at 5 psi (gauge), 6 minutes to treat 100 milliliters of the same polymer solution showed only a marginal improvement, and 1 minute to treat 100 milliliters of the polymer solution (at 15 psi, gauge) was totally unsatisfactory, as determined by xerographic measurements.

The magnesium sulfate and alumina purification methods described above were also applied to polyvinylcarbazole, Ardel polyarylate (Amoco), and polyester Mor-Ester 49,000 (Morton-Thiokol, Inc.). Metal ion contaminants were markedly reduced in all the purified samples of these polymers.

The acid number of Ardel polyarylate was reduced from 1.48 milligrams of hydroxide per gram of resin to 0.65 mg $OH^{31}$ per gram by basic alumina treatment, and to 0.31 mg $OH^-$ per gram by neutral alumina treatment. The antimony oxide catalyst contaminant in Mor-Ester 49,000 was somewhat lowered (but not completely removed) by a column treatment with neutral alumina. The alumina treatment was therefore followed with a magnesium sulfate purification treatment to eliminate catalyst resides from the polyester.

In the present invention, alumina, magnesium sulfate, or both may be used as the adsorbent. If used together, the alumina and magnesium sulfate may be used in any suitable ratio such as 50:50 by weight. The adsorbent such as alumina may have an acidic, neutral or basic pH as an aqueous dispersion of the adsorbent in water. The magnesium sulfate may be anhydrous and slightly acidic.

Prior to use of the present process, the contaminated composition may have an impurity level in the parts per million ("ppm") level, such as from about 5 to about 200 ppm or even less, such as in the parts per billion range. Polyethylene oxide contaminant was found to affect trigonal selenium photoreceptors at levels as low as 1 part per billion in polycarbonate used for the charge transport layer of the device. The present invention reduces the level of impurity in the solution to a xerographically undetectable level. The impurity may be a salt, a polar material, a surfactant, or a mixture thereof. Examples of a salt impurity are a metal salt such as iron oxides, antimony oxide, ruthenium chloride, and the like. Examples of a polar material include glycol such as ethylene glycol, water, organic acids such as adipic acid and acetic acid, amines such as triethylamine, and the like. Examples of a surfactant include polydimethylsiloxane, polyethylene oxide, Triton surfactants, quaternary ammonium compounds, and the like.

In the case of photoreceptors with a trigonal selenium photogenerator (and also those with benzimidazole perylene photogenerator), contaminants such as polyethylene oxide in the polycarbonate charge transport layer can cause the photoreceptor discharge potential (i.e., the residual voltage after light exposure) to increase with use at contamination levels as low as 1 part per billion. This condition, termed photoreceptor cycle-up or loss in cleaning field, markedly affects copy quality. In charge area development (CAD), background areas are prevented from developing toner (dark background) by biasing the development roll at about 100 to 150 volts above the potential of the white background discharge areas. This voltage potential difference is termed the cleaning field. If the photoreceptor is unstable and cycles-up during use (due to impurities that affect the photogenerator pigment or cause charge trapping in other layers of the device), the discharge potential of the background area creeps up during use (cycle-up). With fixed bias on the development roll, the difference on the cleaning field (potential) goes down causing toner to stick to the background areas. This unsatisfactory condition shows up as a slightly dark region in an otherwise white print. Thus, photoreceptor materials must be reliably pure to ensure consistent print quality performance.

Suitable polycarbonate resins include, but are not limited to, resins having a molecular weight from about 20,000 to about 120,000, more preferably from about 50,000 to about 100,000. Examples of such polycarbonate resins are poly(4, 4'-diopropylidene-diphenylene carbonate) with a molecular weight of about 35,000 to about 40,000, available as LEXAN 145™ from General Electric Company; poly(4,4'-isopropylidene-diphenylene carbonate) with a molecular weight of about 40,000 to about 45,000 available as LEXAN 141™ from General Electric Company; a polycarbonate resin having a molecular weight of from about 50,000 to about 100,000, available as MAKROLON™ from Farben Fabricken Bayer A. G.; a polycarbonate resin having a molecular weight of from about 20,000 to about 50,000 available as MERLON™ from Mobay Chemical Company; polyether carbonates; and 4,4'-cyclohexylidene diphenyl polycarbonate. Polycarbonate polymers suitable for practicing this invention also can be made, for example, from 2,2-bis(4-hydroxyphenol)propane; 4,4'-dihydroxy-diphenyl- 1,1-isobutane; 4,4'-dihydroxy-diphenyl-4,4-heptane; 4,4'-dihydroxy-diphenyl-2,2-hexane; 4,4'-dihydroxy-triphenyl-2,2,2-ethane; 4,4'-dihydroxy-diphenyl-1,1-cyclohexane; 4,4'-dihydroxy-diphenyl-beta-beta-decahydronaphthalene; 4,4'-dihydroxy-diphenyl-sulphone and the like. High heat resistant polyphthalate carbonate resins such as LEXAN 4701™ and 4501™ available from General Electric Company and the like are also suitable.

Typical carbazole polymers include, for example, polyvinylcarbazole and polyvinylcarbazole derivatives. Preferably, the carbazole polymers are selected from the group consisting of polymers having the structural formulae (A), (B), (C) and (D) below:

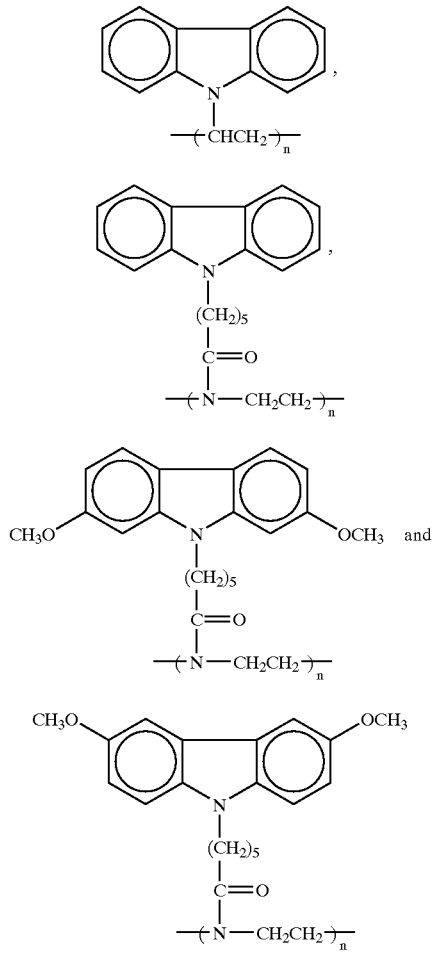

wherein n, degree of polymerization, is a number between about 800 and about 6,000. The polymer may comprise a single carbazole polymer or a mixture of carbazole polymers.

A typical polyarylate has repeating units represented in the following formula:

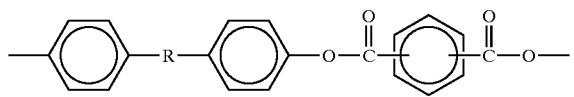

wherein R is $C_1$–$C_6$ alkylene, preferably $C_3$ as in isopropylidene. These polyarylates are solvent soluble and have a weight average molecular weight greater than about 5,000 and preferably greater than about 30,000. The preferred polyarylate polymers have recurring units of the formula:

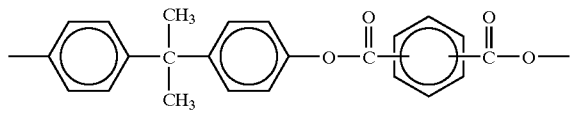

The phthalate moiety may be from isophthalic acid, terephthalic acid or a mixture of the two at any suitable ratios ranging from about 99 percent isophthalic acid and about 1 percent terephthalic acid to about 1 percent isophthalic acid and about 99 percent terephthalic acid, with a preferred mixture being between about 75 percent isophthalic acid and about 25 percent terephthalic acid and especially between about 50 percent isophthalic acid and about 50 percent terephthalic acid. The polyarylates ARDEL™ from Amoco and DUREL™ from Celanese Chemical Company are preferred polymers. The most preferred polyarylate polymer is available from the Amoco Performance Products under the tradename ARDEL™ D-100. ARDEL™ is prepared from bisphenol-A and a mixture of 50 mole percent each of terephthalic and isophthalic acid chlorides by conventional methods. ARDEL™ D-100 has a melt flow at 375° C. of 4.5 g/10 minutes, a density of 1.21 Mg/m³, a refractive index of 1.61, a tensile strength at yield of 69 MPa, a thermal conductivity (k) of 0.18 W/m°K and a volume resistivity of $3 \times 10^{16}$ ohm-cm. DUREL™ is an amorphous homopolymer with a weight average molecular weight of about 20,000 to about 200,000. Two or more different polyarylates may be used. These polyarylates are disclosed in U.S. Pat. No. 5,492,785, the entire disclosure thereof being incorporated herein by reference.

Any suitable copolyester film forming resin may be used. An especially preferred copolyester is a linear saturated copolyester reaction product of four diacids and ethylene glycol. The molecular structure of this linear saturated copolyester has the following structural formula:

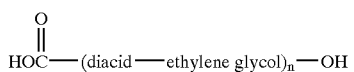

where n is the degree of polymerization which is between about 170 and about 370. The mole ratio of diacid to ethylene glycol in the copolyester is 1:1. The diacids are terephthalic acid, isophthalic acid, adipic acid and azelaic acid. The mole ratio of terephthalic acid to isophthalic acid to adipic acid to azelaic acid is 4:4:1:1. A representative linear saturated copolyester of this structure is commercially available as Mor-Ester 49,000 (available from Morton International Inc., previously available from duPont de Nemours & Co.). The Mor-Ester 49,000 is a linear saturated copolyester which consists of alternating monomer units of ethylene glycol and four randomly sequenced diacids in the above indicated ratio and n in the structural formula has a value which gives a weight average molecular weight of about 70,000. This linear saturated copolyester has a Tg of about 32° C. Another preferred representative polyester resin is a copolyester resin having the structural formula below where the diacid is selected from the group consisting of terephthalic acid, isophthalic acid, and mixtures thereof; the diol is selected from the group consisting of ethylene glycol, 2,2-dimethyl propane diol and mixtures thereof; the ratio of diacid to diol is 1:1; n is a number between about 175 and about 350 and the Tg of the copolyester resin is between about 50° C. about 80° C. Typical polyester resins having the above structure are commercially available and include, for example, Vitel PE-100, Vitel PE-200, Vitel PE-200D, and Vitel PE-222, all available from Goodyear Tire and Rubber Co. More specifically, Vitel PE-100 polyester resin is a linear saturated copolyester of two diacids and ethylene glycol where the ratio of diacid to ethylene glycol in this copolyester is 1:1. The diacids are terephthalic acid and isophthalic acid. The ratio of terephthalic acid to isophthalic acid is 3:2. The Vitel PE-100 linear saturated copolyester consists of alternating monomer units of ethylene glycol and two randomly sequenced diacids in the above indicated ratio and has a weight average molecular weight of about 50,000 and a Tg of about 71° C. This copolyester is represented by the following formula:

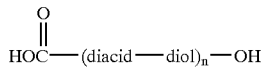

wherein the diacid is selected from the group consisting of terephthalic acid, isophthalic acid, and mixtures thereof, the diol comprises ethylene glycol and 2,2-dimethyl propane diol, the mole ratio of diacid to diol is 1:1, the mole ratio of terephthalic acid to isophthalic acid is 1.2:1, the mole ratio of ethylene glycol to 2,2-dimethyl propane diol is 1.33:1, n is a number between about 160 and about 330, and the Tg of said copolyester resin is between about 50° C. and about 80° C.

Another polyester resin, represented by the above formula, is Vitel PE-200 available from Goodyear Tire & Rubber Co. This polyester resin is a linear saturated copolyester of two diacids and two diols where the ratio of diacid to diol in the copolyester is 1:1. The diacids are terephthalic acid and isophthalic acid. The ratio of terephthalic acid to isophthalic acid is 1.2:1. The two diols are ethylene glycol and 2,2-dimethyl propane diol. The ratio of ethylene glycol to dimethyl propane diol is 1.33:1. The Goodyear PE-200 linear saturated copolyester consists of randomly alternating monomer units of the two diacids and the two diols in the above indicated ratio and has a weight average molecular weight of about 45,000 and a Tg of about 67° C.

Any suitable solvent may be used. Typical solvents include tetrahydrofuran, toluene, hexane, cyclohexane, cyclohexanone, methylene chloride, 1,1,2-trichloroethane, monochlorobenzene, chloroform, N-methylpyrrolidinone, N,N-dimethylformamide, N,N-dimethylacetamide, and the like, and mixtures thereof. Any suitable ratio of the solvent to the polymer may be employed; the polymer may be present in the solvent at a concentration ranging for example from about 1% to about 20% by weight of the solvent.

The invention will now be described in detail with respect to specific preferred embodiments thereof, it being understood that these examples are intended to be illustrative only and the invention is not intended to be limited to the materials, conditions, or process parameters recited herein. All percentages and parts are by weight unless otherwise indicated.

A number of the Examples below relates to the preparation of bisimidazole perylene ("BZP") photogenerator layers. Specifically, the benzimidazole perylene was dispersed with PCZ-polycarbonate binder in tetrahydrofuran. A photogenerating layer of BZP, which is preferably a mixture of bisbenzimidazo(2,1-a-1',2'-b)anthra(2,1,9-def:6,5,10-d'e'f') diisoquinoline-6,11-dione and bisbenzimidazo(2,1-a:2',1'-a) anthra(2,1,9-def:6,5,10-d'e'f')diisoquinoline-10, 21-dione, is taught in U.S. Pat. No. 4,587,189. There are also disclosed in U.S. Pat. No. 3,871,882 photoconductive substances comprised of specific perylene-3,4,9,10-tetracarboxylic acid derivative dyestuffs. In accordance with this patent, the photoconductive layer is preferably formed by vapor depositing the dyestuff in a vacuum. Also, there are specifically disclosed in this patent dual layer photoreceptors with perylene-3,4,9,10-tetracarboxylic acid diimide derivatives, which have spectral response in the wavelength region of from 400 to 600 nanometers. In U.S. Pat. No. 4,587,189, there is illustrated a layered imaging member with, for example, a BZP perylene, pigment photogenerating component. Both of the aforementioned patents disclose an aryl amine component, such as N,N'-diphenyl-N,N'-bis(3-methyl phenyl)-1,1'-biphenyl-4,4'-diamine dispersed in a polycarbonate binder, as a hole transport layer.

EXAMPLE 1

Polycarbonate Purification With Magnesium Sulfate

A batch of MAKROLON™ polycarbonate was determined to be contaminated with about 20 parts per million polyethylene oxide with a molecular weight of about 8000. Other impurities may also be present. About 100 grams of the contaminated polycarbonate at 10% solids in methylene chloride were stirred with 50 grams of anhydrous magnesium sulfate (Fisher Scientific, catalog number M65-500) for 16 hours and then filtered. The magnesium sulfate was a very fine powder and slightly acidic. The filtrate was added to methanol to precipate the polycarbonate using a Waring blender. The purified polycarbonate was then collected by filtration and vacuum dried. The purified polycarbonate (about 1.2 grams), N,N'-diphenyl-N,N'-bis(3-methylphenyl)-(1,1'-biphenyl)-4,4'diamine (1.2 grams), and methylene chloride (13.46 grams) were roll-milled until a solution formed. Ten micro-liters of a 1 weight % solution of trifluoroacetic acid in methylene chloride solvent were then added, and the resultant solution was coated using a 4 mil Bird applicator bar onto a trigonal selenium binder-generator substrate. The trigonal selenium binder-generator substrate consisted of metallized MYLAR™ with a 1000 Angstrom layer of hydrolyzed gamma-aminopropyltriethoxysilane. The hydrolyzed gamma-aminopropyltriethoxysilane (gamma-APS) undercoat layer was formed in accordance with U.S. Pat. No. 4,464,450. A coating solution was made by adding gamma-aminopropyltriethoxysilane (gamma-APS, 1 gram, obtained from Aldrich or Dow Corning) to deionized water (4 grams) and the solution was magnetically stirred for 4 hours. Glacial acetic acid (0.3 grams) was then added and stirring was continued for 10 minutes. Ethanol (74.7 grams) was then added followed by heptane (or octane, 20 grams). The coating solution was applied to a metallized Mylar substrate comprising a vacuum deposited titanium layer on a polyethylene terepthalate film substrate using a 1 mil gap Bird applicator. The coating was oven dried for 10 minutes at 135 degrees C. To this layer was applied a 1000 Angstrom layer of Mor-Ester 49,000 adhesive (available from Morton International Inc.), applied at a 1-mil wet thickness as a 0.5 wt.

% solids solution in methylene chloride followed by drying at 130° C. for 3 minutes. To this layer was applied a photogenerator layer consisting of a polyvinylcarbazole-trigonal selenium dispersion. The photogenerating layer contained 7.5 percent by volume trigonal selenium, 25 percent by volume N,N'-diphenyl-N,N'-bis(3"-methylphenyl)-(1,1'-biphenyl)-4,4'-diamine), and a polyvinylcarbazole binder (67.5 percent by volume) (obtained from BASF, Mt. Olive, N.J.). The photogenerating layer in each instance was prepared by introducing 8 grams of polyvinyl carbazole and 140 milliliters of a 1:1 volume ratio of a mixture of tetrahydrofuran and toluene into a 20 ounce amber bottle. To this solution was added 8 grams of trigonal selenium and 1,000 grams of ⅛ inch (3.2 milliliter) diameter stainless steel shot. This mixture was then placed on a ball mill for 96 hours. Subsequently, 50 grams of the resulting slurry were added to a solution of 3.6 grams of polyvinyl carbazole and 20 grams of N,N'-diphenyl-N,N'-bis(3"-methylphenyl)-(1,1'-biphenyl)-4,4'-diamine) dissolved in 75 milliliters of 1:1 volume ratio of tetrahydrofuran/toluene. This slurry was then placed on a paint shaker for 10 minutes. The resulting slurry was thereafter applied to the adhesive interface by solution coating to form a layer having a wet thickness of 0.5 mil (12.7 microns). This photogenerating layer was dried at 135° C. for 5 minutes in a forced air oven to form a dry thickness of 2.0 microns. This process for preparing a photogenerating layer is also disclosed in U.S. Pat. No. 5,308,725, the disclosure of which is totally incorporated herein by reference.

The coated device was then ramp heated from 40 to 100 degrees C. over 30 minutes. This photoreceptor device did not demonstrate residual voltage cycle-up and did not have cleaning field loss problems when evaluated with a motionless scanner system.

COMPARATIVE EXAMPLE 2A

Contaminated Polycarbonate

A photoreceptor device was fabricated using the procedure disclosed in Example 1 except that the contaminated polycarbonate was not purified. The resulting photoreceptor device undesirably exhibited high voltage cycle-up (within 300 charge-light discharge and erase cycles) and loss of cleaning field. We estimated the contamination levels in some of the different commercial polycarbonates at between 5 and 50 parts per million dependent on the sample received.

COMPARATIVE EXAMPLE 2B

Contaminated Polycarbonate

A photoreceptor device was fabricated using the procedure disclosed in Example 1 except that the purified polycarbonate was intentionally contaminated with polyethylene oxide. Polyethylene oxide (Scientific Polymer Products, catalog number 491, with 7000 molecular weight) was added at 0.1, 0.2, 0.5, 1, 3, and 6 ppm, based on polycarbonate, respectively. All the resulting photoreceptor devices undesirably exhibited high voltage cycle-up and loss of cleaning field. An extrapolation of the data suggested that 1 part per billion polyethylene oxide would be detectable as cycle-up in trigonal selenium photoreceptor devices within 2000 charge-light discharge and erase cycles. Triton X-405 at 10 parts per million behaved similarly to the polyethylene oxide at comparable concentrations in polycarbonate in back-doping experiments.

EXAMPLE 2

Polycarbonate Purification With Alumina

Contaminated polycarbonate (5 grams, with 20 parts per million polyethylene oxide, 8000 molecular weight) in methylene chloride (90 grams) was passed drop-wise through a 100-milliliter burette (with a 0.75-inch diameter) packed with 60 milliliters of acidic alumina (activity grade 1, Woelm acid grade (Waters Associates, 61 Fountain St., Farminton, Mass. 01701) by eluting generously with methylene chloride. No trace of the PEO contaminant remained. These experiments were repeated with neutral alumina (Aldrich catalog number 19,997-4) and basic alumina (Woelm), respectively, with comparable successful results.

Fluid throughput in the column was also important. A column (Aldrich pressure filter funnel catalog number Z14, 767-2) was packed with about 4-inches of neutral alumina (Aldrich catalog number 19,997-4). Thirty minutes of treatment time was required to remove all the PEO contaminant from 100 milliliters of a 5 weight percent solids solution of the PEO contaminated polycarbonate in methylene chloride by generous elution with methylene chloride. When the flow rate was increased by vacuum filtration at 5 psi (gauge), 6 minutes to treat 100 milliliters of the same contaminated polycarbonate solution showed only a marginal improvement, and 1 minute to treat 100 milliliters of the contaminated polycarbonate solution (at 15 psi, gauge) was completely unsatisfactory, as determined by xerographic measurements.

EXAMPLE 3

Polyvinyl Carbazole Purification

Polyvinylcarbazole (50 grams) in methylene chloride (625 milliliters) was treated with magnesium sulfate (Fisher Scientific, catalog number M65-500, 25 grams) for 16 hours with stirring. The dispersion was then centrifuged to remove magnesium sulfate, filtered, and then added to methanol to reprecipitate the purified polyvinylcarbazole. The vacuum dried product was used to make trigonal selenium photogenerator dispersions. The photogenerating layer contained 7.5 percent by volume trigonal selenium, 25 percent by volume N,N'-diphenyl-N,N'-bis(3"-methylphenyl)-(1,1'-biphenyl)-4,4'-diamine), and the purified polyvinylcarbazole binder (67.5 percent by volume). The photogenerating layer in each instance was prepared by introducing 8 grams of the purified polyvinyl carbazole and 140 milliliters of a 1:1 volume ratio of a mixture of tetrahydrofuran and toluene into a 20 ounce amber bottle. To this solution was added 8 grams of trigonal selenium and 1,000 grams of ⅛ inch (3.2 milliliter) diameter stainless steel shot. This mixture was then placed on a roll mill for 96 hours. Subsequently, 50 grams of the resulting slurry were added to a solution of 3.6 grams of purified polyvinyl carbazole and 20 grams of N,N'-diphenyl-N,N'-bis(3"-methylphenyl)-(1,1'-biphenyl)-4,4'-diamine) dissolved in 75 milliliters of 1:1 volume ratio of tetrahydrofuran/toluene. This slurry was then placed on a paint shaker for 10 minutes. The resulting slurry was thereafter applied to the adhesive interface by solution coating to form a layer having a wet thickness of 0.5 mil (12.7 microns). This photogenerating layer was dried at 135° C. for 5 minutes in a forced air oven to form a dry thickness of 2.0 microns. This process for preparing a photogenerating layer is also disclosed in U.S. Pat. No. 5,308,725, the disclosure of which is totally incorporated herein by reference. Photoreceptors made with the purified polyvinylcarbazole did not show cycle-up or loss in cleaning field.

COMPARATIVE EXAMPLE 3

Contaminated Polyvinyl Carbazole

A photoreceptor device was fabricated using the procedure disclosed in Example 3 except that a polyvinylcarbazole contaminated with 10 parts per million polyethylene oxide (7,000 molecular weight) was used without purification. The resulting photoreceptor device undesirably exhibited high voltage cycle-up (within 300 charge-light discharge and erase cycles) and loss of cleaning field.

EXAMPLE 4

Polyarylate Purification

Ardel (20 grams, D-100, Amoco), with an acid number of 1.48 milligrams of hydroxide per gram of resin, in methylene chloride (500 grams) was passed through a 36-inch column (2-inch diameter) packed with neutral alumina (Aldrich) by generous elution with methylene chloride. Four (100 milliliter) fractions were collected. The first fraction had no polymer; the second fraction had 5.1 grams of polyarylate with an acid number of 0.31 milligrams of hydroxide per gram of resin, the third fraction had 2.9 grams of polyarylate, and the fourth fraction had 2.3 grams of polymer. A similar treatment of the Ardel polymer with basic alumina reduced the acid number to 0.65 milligrams of hydroxide groups per gram of resin. These purified polyarylates were applied at a 1-mil wet thickness as a 0.5 wt. % solids solution in methylene chloride followed by drying at 130° C. for 3 minutes to metallized MYLAR™ with a 1000 Angstrom layer of hydrolyzed gamma-aminopropyltriethoxy silane. To this layer was applied a photogenerator layer consisting of a polyvinylcarbazole-trigonal selenium, and the remainder of the photoreceptor device was made as in Example 1. Photoreceptors made with the purified polyarylate samples did not show cycle-up or loss in cleaning field. Photoreceptors were made with a benzimidazole perylene (BZP) photogenerator using the purified polyarylate samples as an interfacial layer of the device. The light energy required to discharge the BZP-photoreceptor from 600 volts to 100 volts was 8.8 ergs for an as-received polyarylate (with an acid number of 1.48 mg OH⁻/g), 8.9 ergs for the basic alumina treated device (with an acid number of 0.65 mgOH⁻/g required 8.9 ergs), 8.2 ergs for the neutral alumina treated polyarylate device (fraction 2, with an acid number of 0.31 mg OH⁻/g), and 9 ergs for fraction 3. No cycle-up or loss in cleaning field was observed with the purified polymers.

COMPARATIVE EXAMPLE 4

Contaminated Polyarylate

A photoreceptor device was fabricated using the procedure disclosed in Example 4 except that a polyarylate contaminated with 10 ppm polyethylene oxide was used without purification. The resulting photoreceptor device undesirably exhibited high voltage cycle-up (within 300 charge-light discharge and erase cycles) and loss of cleaning field.

EXAMPLE 5

Copolyester Purification

A blue-green batch of Mor-Ester 49,000 (50 grams) in methylene chloride (500 grams) was passed through a 36-inch column (2-inch diameter) packed with neutral alumina (Aldrich) by generous elution with methylene chloride. The polymer still contained appreciable amounts of antimony oxide as evidenced by a hazy solution. Consequently, the polymer solution was treated with magnesium sulfate (25 grams) for 16 hours with stirring, was then centrifuged and then was filtered., The filtate was added to methanol (1 gallon) using a Waring blender to precipitate white, purified polyester. The purified polyester was applied at a 1-mil wet thickness as a 0.5 wt. % solids solution in methylene chloride followed by drying at 130° C. for 3 minutes to metallized MYLAR™ with a 1000 Angstrom layer of hydrolyzed gamma-aminopropyltriethoxy silane. To this layer was applied a photogenerator layer consisting of a polyvinylcarbazole-trigonal selenium, and the remainder of the photoreceptor device was made as in Example 1. Photoreceptors made with the purified polyester did not show cycle-up or loss in cleaning field. A photoreceptor was made with a benzimidazole perylene (BZP) photogenerator using the purified polyester sample as an interfacial layer of the device. The light energy required to discharge the BZP-photoreceptor from 600 volts to 100 volts was 8.7 ergs.

COMPARATIVE EXAMPLE 5

Contaminated Copolyester

A photoreceptor device was fabricated using the procedure disclosed in Example 5 except that a Mor-Ester 49,000 sample contaminated with 10 ppm polyethylene oxide was used without purification. The resulting photoreceptor device undesirably exhibited high voltage cycle-up (within 300 charge-light discharge and erase cycles) and loss of cleaning field.

Other modifications of the present invention may occur to those skilled in the art based upon a reading of the present disclosure and these modifications are intended to be included within the scope of the present invention.

We claim:

1. A purification process comprising: contacting a contaminated composition comprised of an optional fluid, a polymer, and an impurity with an adsorbent composition including an adsorbent, wherein the adsorbent is selected from the group consisting of an alumina and a magnesium sulfate, wherein a portion of the impurity binds to the adsorbent, wherein the polymer is a polycarbonate, a carbazole, a polyarylate, or a copolyester having the formula

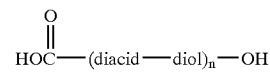

where n is the degree of polymerization wherein the impurity is at least one of a salt, a polar material, and a surfactant.

2. The process of claim 1, wherein the polycarbonate has a molecular weight ranging from about 50,000 to about 100,000.

3. The process of claim 1, wherein the carbazole is polyvinylcarbazole.

4. The process of claim 1, wherein the polyarylate is prepared from bisphenol-A and a mixture comprised of 50 mole percent each of terephthalic and isophthalic acid chlorides.

5. The process of claim 1, wherein the copolyester includes ethylene glycol as the diol and four diacids: terephthalic acid, isophthalic acid, adipic acid, and azelaic acid.

6. The process of claim 1, wherein the fluid is an organic solvent.

7. The process of claim 1, wherein the adsorbent composition includes the alumina and water.

8. The process of claim 1, wherein the contacting comprises passing the contaminated composition through a column containing the adsorbent composition.

9. The process of claim 1, wherein the contacting comprises forming a slurry of the contaminated composition and the adsorbent composition, thereby resulting in a liquid portion and a solids portion in the slurry, and then separating the liquid portion from the solids portion.

10. The process of claim 1, wherein the contaminated composition contacts the adsorbent composition for at least about 30 minutes.

11. The process of claim 1, wherein the contaminated composition contacts the adsorbent composition for at least about 4 hours.

12. The process of claim 1, wherein the adsorbent composition includes the adsorbent and another fluid.

13. The process of claim 12, wherein the optional fluid in the contaminated composition is different from the another fluid.

14. The process of claim 1, wherein the polymer is the polycarbonate and the adsorbent is the magnesium sulfate.

* * * * *